(12) United States Patent
Brownlow et al.

(10) Patent No.: US 8,726,276 B2
(45) Date of Patent: May 13, 2014

(54) RESETTING A VIRTUAL FUNCTION THAT IS HOSTED BY AN INPUT/OUTPUT ADAPTER

(75) Inventors: Sean T. Brownlow, Rochester, MN (US); John R. Oberly, III, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 13/013,939

(22) Filed: Jan. 26, 2011

(65) Prior Publication Data

US 2012/0192178 A1    Jul. 26, 2012

(51) Int. Cl.
G06F 9/455    (2006.01)

(52) U.S. Cl.
USPC .......................................................... 718/1

(58) Field of Classification Search
None
See application file for complete search history.

(56) References Cited

U.S. PATENT DOCUMENTS

| | | | |
|---|---|---|---|
| 8,141,092 B2 * | 3/2012 | Brown et al. | 718/104 |
| 8,141,093 B2 * | 3/2012 | Brown et al. | 718/104 |
| 8,141,094 B2 * | 3/2012 | Brown et al. | 718/104 |
| 8,239,655 B2 * | 8/2012 | Goggin et al. | 711/203 |
| 8,291,135 B2 * | 10/2012 | Subramanian et al. | 710/39 |
| 8,301,806 B2 * | 10/2012 | Brownlow et al. | 710/10 |
| 8,359,415 B2 * | 1/2013 | Brown et al. | 710/62 |
| 8,473,947 B2 * | 6/2013 | Goggin et al. | 718/1 |
| 8,489,699 B2 * | 7/2013 | Goggin et al. | 709/213 |
| 2009/0133016 A1 * | 5/2009 | Brown et al. | 718/1 |
| 2009/0248937 A1 | 10/2009 | Solomon et al. | |
| 2009/0249366 A1 * | 10/2009 | Sen et al. | 719/327 |
| 2009/0276773 A1 | 11/2009 | Brown et al. | |
| 2009/0313391 A1 | 12/2009 | Watanabe | |
| 2010/0014526 A1 | 1/2010 | Chavan et al. | |
| 2010/0082874 A1 | 4/2010 | Baba et al. | |
| 2010/0095310 A1 | 4/2010 | Oshins | |
| 2010/0180274 A1 | 7/2010 | Cherian et al. | |

\* cited by examiner

Primary Examiner — Van Nguyen
(74) Attorney, Agent, or Firm — Toler Law Group (57) ABSTRACT

A computer-implemented method may include selecting a first virtual function that is hosted by a hardware input/output adapter and identifying a first logical partition that is associated with the first virtual function. The computer-implemented method may include retrieving first data corresponding to the first virtual function from a table in response to determining that the first logical partition has initiated a shutdown operation. The computer-implemented method may also include creating a first reset virtual function structure that includes at least a portion of the first data. The computer-implemented method may include sending the first reset virtual function structure to a dispatchable hypervisor.

10 Claims, 9 Drawing Sheets

RESETTING A VIRTUAL FUNCTION THAT IS HOSTED BY AN INPUT/OUTPUT ADAPTER

FIELD OF THE DISCLOSURE

The present disclosure relates generally to computer systems, and more particularly, to managing virtualized functions that are hosted by a virtualized input/output (I/O) adapter.

BACKGROUND

A logically-partitioned computer system may use a virtualized hardware input/output (I/O) adapter to provide virtual functions to multiple logical partitions. Under particular conditions, one or more of the virtual functions may be reset. For example, if a logical partition is in the process of shutting down, the virtual functions that were being used by the logical partition may be reset to enable the virtual functions to be used by other logical partitions.

SUMMARY

In a particular embodiment, a computer-implemented method includes selecting a first virtual function that is hosted by a hardware input/output adapter and identifying a first logical partition that is associated with the first virtual function. The computer-implemented method may include retrieving first data corresponding to the first virtual function from a table in response to determining that the first logical partition has initiated a shutdown operation. The computer-implemented method may also include creating a first reset virtual function structure that includes at least a portion of the first data. The computer-implemented method may include sending the first reset virtual function structure to a dispatchable hypervisor.

In another particular embodiment, an apparatus includes a processor and a memory to store program code. The program code may be executable by the processor to select an entry of table. The entry of the table may correspond to a virtual function hosted by a hardware input/output (I/O) adapter. The entry includes a state of the virtual function. The program code may be executable by the processor to send a reset command to reset the virtual function at the hardware I/O adapter in response to determining that the state of the virtual function comprises a reset pending state. The program code may be executable by the processor to indicate that a delay is needed. The program code may be executable by the processor to set the state of the virtual function in the entry to a reset in progress state.

In another particular embodiment, a computer program product includes a non-transitory computer usable medium having computer usable program code embodied therewith. The computer usable program code may be executable by a processor to select, at a hypervisor, a first virtual function of a plurality of virtual functions that are hosted by a hardware input/output adapter. The computer usable program code may be executable by the processor to identify a first logical partition that is associated with the first virtual function. The computer usable program code may be executable by the processor to retrieve first data corresponding to the first virtual function from a table in response to determining that the first logical partition has initiated a shutdown process in response to determining that the first logical partition has initiated a shutdown process. The computer usable program code may be executable by the processor to create a first reset virtual function structure that includes at least a portion of the first data. The computer usable program code may be executable by the processor to send the first reset virtual function structure to a dispatchable hypervisor.

These and other advantages and features that characterize embodiments of the disclosure are set forth in the claims listed below. However, for a better understanding of the disclosure, and of the advantages and objectives attained through its use, reference should be made to the drawings and to the accompanying descriptive matter in which there are described exemplary embodiments of the disclosure.

DETAILED DESCRIPTION

In a virtualized computer system, a hardware input/output (I/O) adapter may be capable of providing virtual functions to multiple logical partitions. When a logical partition requests a virtual function during runtime, internal resources of the hardware I/O adapter may be allocated to the virtual function. The internal resources may include ingress queues, egress queues, operating modes (e.g., promiscuous mode and diagnostic mode), interrupt sources, other internal resources, or any combination thereof. The virtual function may be configured to use the allocated internal resources of the hardware I/O adapter. The configured virtual function may be assigned to a particular logical partition to enable the logical partition to perform I/O operations.

Under certain conditions, one or more of the virtual functions may be reset. For example, a portion of the internal resources of the hardware I/O adapter, such as one or more queues, may be assigned to a virtual function. The virtual function may be assigned to a logical partition to enable the logical partition to perform I/O operations. After the logical partition is shutdown, the internal resources that the virtual function was using may be left in an intermediate state. The virtual function may be reset to enable the internal resources that were assigned to the virtual function, such as the one or more queues, to be reset to an initial state from the intermediate state. After the virtual function is reset, the virtual function may be assigned to another logical partition.

In a particular embodiment, the virtual function may be reset to enable the internal resources that were assigned to the virtual function, such as the one or more queues, to be reused by a different virtual function. After the virtual function is reset, at least a portion of the internal resources that were assigned to the virtual function may be reassigned to the different virtual function.

The hardware I/O adapter may be capable of providing hundreds or thousands of virtual functions. In a runtime environment, individually resetting virtual functions may be time consuming and may use system resources. By batching virtual function resets, the time taken to reset multiple virtual functions may be reduced as compared to individually resetting virtual functions. In this way, system resources used to reset the multiple functions may also be reduced.

Requests to reset virtual functions may be accumulated to create a first batch of reset requests. The first batch of reset requests may be sent to a reset manager (e.g., a sequencer). The reset requests that are received while the first batch of reset requests is being processed may be accumulated to create a second batch of reset requests. After the first batch of reset requests has been processed by the reset manager, the second batch of reset requests may be sent to the reset manager. The preceding process may repeat, e.g., the reset requests received while the second batch of reset requests is being processed may be accumulated to create a third batch of reset requests that are sent to the reset manager after the second batch of reset requests has been processed and so on. A batch of reset requests may be sent to a reset manager periodically (e.g., at a fixed time interval), after a particular number of reset requests have been accumulated, after a single reset request is received, or any combination thereof.

Figure 1:
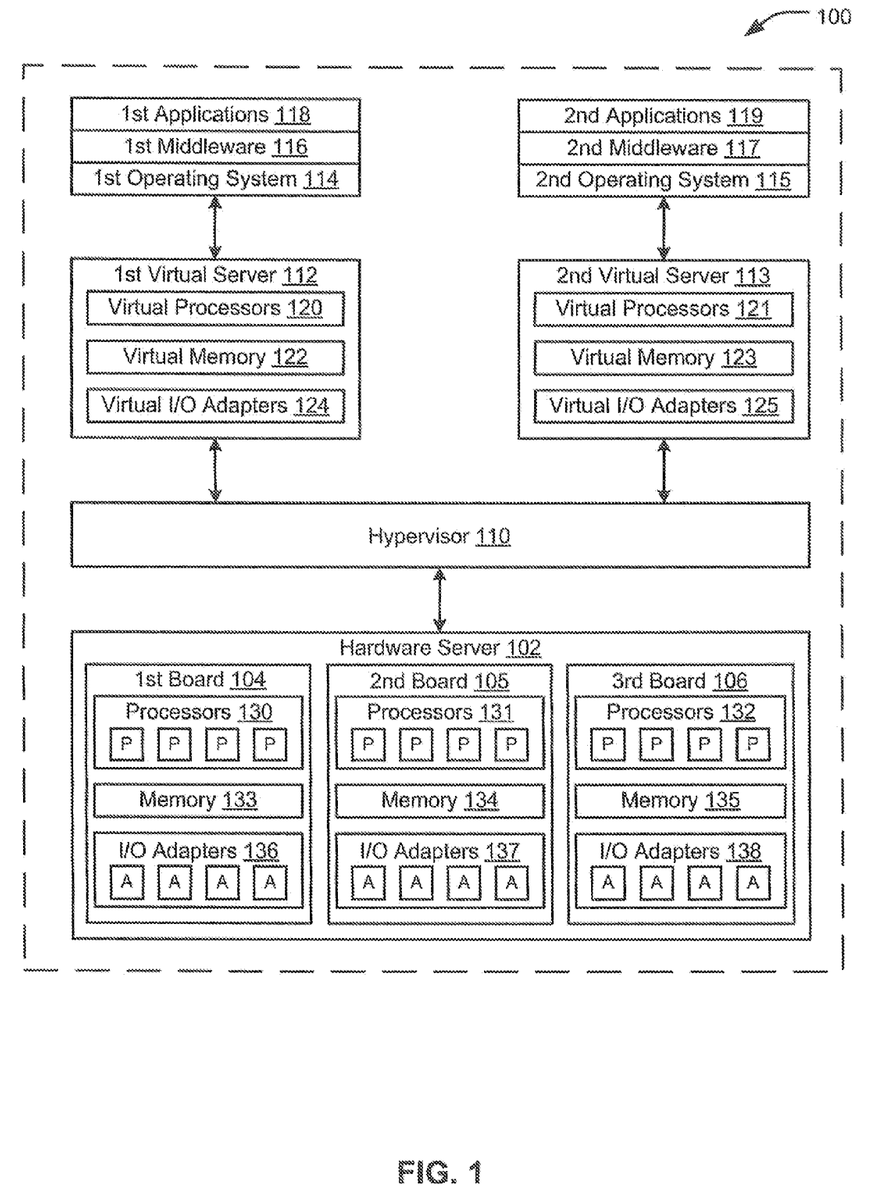
FIG. 1 is a block diagram of a first embodiment of a system to enable resetting a virtual function.

Referring to FIG. 1, a block diagram of a first embodiment of a system to enable resetting a virtual function is depicted and generally designated 100. The system 100 may include a hardware server 102 that is managed by a hypervisor 110. The hardware server 102 may include hardware resources, such as a first board 104, a second board 105, and a third board 106. While three boards are illustrated in FIG. 1, the number of boards may be increased or decreased based on processing considerations. The boards 104-106 may include processors 130-132, memory 133-135, and input/output (I/O) adapters 136-138. Each of the boards 104-106 may include additional hardware resources (not shown), such as specialized processors (e.g., digital signal processors, graphics processors, etc.), disk drivers, other types of hardware, or any combination thereof. The processors 130-132, the memory 133-135, and the I/O adapters 136-138 of the hardware server 102 may be managed by hypervisor 110. Each processor of the processors 130-132 may be a simultaneous multithreading (SMT)-capable processor that is capable of concurrently executing multiple different threads.

The hypervisor 110 may create and manage logical partitions, such as virtual servers 112, 113. A logical partition may be a subset of the resources of the hardware server 102 that is virtualized as a separate virtual server. Each of the virtual servers 112, 113 may have its own set of virtual resources, similar to a physical server. For example, the first virtual server 112 may include virtual processors 120, virtual memory 122, and virtual I/O adapters 124. Virtual server 113 may include virtual processors 121, virtual memory 123, and virtual I/O adapters 125. The hypervisor 110 may map the hardware of the hardware server 102 to the virtual servers 112, 113. For example, the processors 130-132 may be mapped to the virtual processors 120, 121; the memory 133-135 may be mapped to the virtual memory 122, 123, and the I/O adapters 136-138 may be mapped to the virtual I/O adapters 124-125. The hypervisor 110 may manage the selection of portions of the hardware server 102 and their temporary assignment to portions of the virtual servers 112, 113.

In the system 100, if a logical partition (e.g., one of the virtual servers 112 and 113) is shutdown, the hypervisor 110 may receive an instruction to reset the virtual functions (e.g., one or more of the virtual I/O adapters 124 and 125) that are assigned to the logical partition. The hypervisor 110 may reset the virtual function to enable the virtual function to be assigned to another logical partition.

Figure 2:
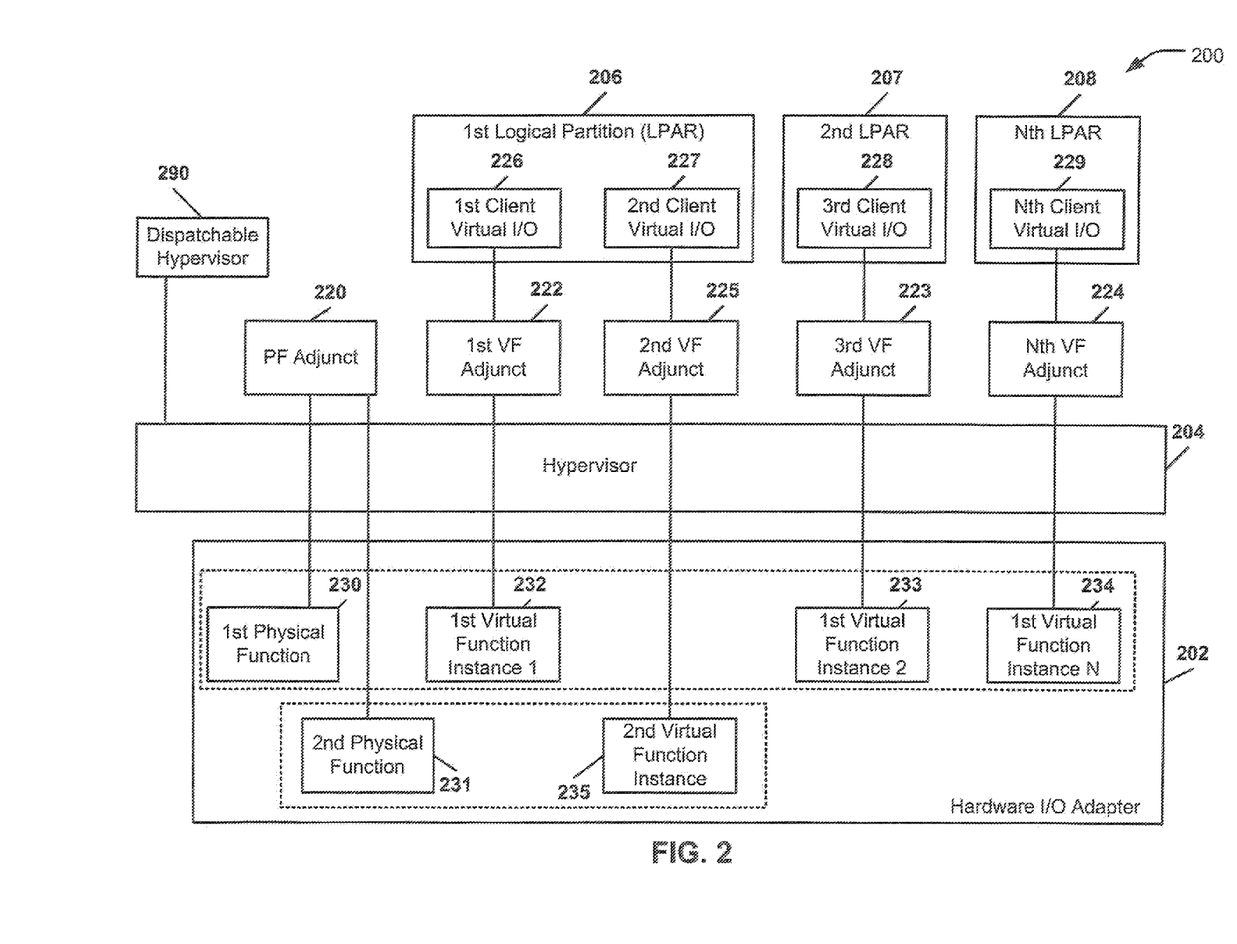
FIG. 2 is a block diagram of a second embodiment of a system to enable resetting a virtual function.

Referring to FIG. 2, a block diagram of a second embodiment of a system to enable resetting a virtual function is depicted and generally designated 200. In the system 200, a hypervisor 204 may enable multiple logical partitions to access virtual functions provided by hardware that includes a hardware I/O adapter 202. For example, the hypervisor 204 may enable a first logical partition 206, a second logical partition 207, and an Nth logical partition 208, to access virtual functions 232-235 that are provided by the hardware I/O adapter 202. To illustrate, the hypervisor 204 may use a first physical function 230 of the hardware I/O adapter 202 to provide a first instance of a first virtual function 232, a second instance of a first virtual function 233, and an Nth instance of a first virtual function 234 to the logical partitions 206-208. The hypervisor 204 may use a second physical function 231 of the hardware I/O adapter 202 to provide a second virtual function 235 to the logical partitions 206-208.

The hypervisor 204 may perform various functions in combination with a dispatchable hypervisor 290. The dispatchable hypervisor 290 may include low-level firmware code that can execute in a preemptible mode. For example, the hypervisor 204 may dispatch the dispatchable hypervisor 290 for execution in a manner similar to the way the hypervisor 204 dispatches different logical partitions for execution. In contrast, the hypervisor 204 may execute in a non-dispatchable mode that may be referred to as kernel mode.

The physical functions 230, 231 may include peripheral component interconnect (PCI) functions that support single root I/O virtualization capabilities (SR-IOV). Each of the virtual functions 232-235 may be associated with one of the physical functions 230, 231 and may share one or more physical resources of the hardware I/O adapter 202.

Software modules, such as a physical function (PF) adjunct 220 and virtual function (VF) adjuncts 222-225, may assist the hypervisor in managing the physical functions 230, 231 and the virtual functions 232-235. For example, a user may specify a particular configuration and the PF manager 220 may configure the virtual functions 232-235 from the physical functions 230, 231 accordingly. The VF adjuncts 222-225 may function as virtual device drivers. For example, just as a device driver for a physical device may enable a client application to access the functions of the device, each of the VF adjuncts 222-225 may enable a client application to access the virtual functions 232-235. In the system 200, the VF adjuncts 222 and 224-225 may enable access to the first virtual function instances 232 and 234-235, and the second VF adjunct 225 may enable access to the second virtual function 235.

In operation, the PF manager 220 may enable the first virtual function instances 232-234 from the first physical function 230. The PF manager 220 may enable the second virtual function 235 from the second physical function 231. The virtual functions 232-235 may be enabled based on a user provided configuration. Each of the logical partitions 206-208 may execute an operating system (not shown) and client applications (not shown). The client applications that execute at the logical partitions 206-208 may perform virtual input/output operations. For example, a first client application executing at the first logical partition 206 may include first client virtual I/O 226, and a second client application executing at the first logical partition 206 may include a second client virtual I/O 227. The first client virtual I/O 226 may access the first instance of the first virtual function 232 via the first VF adjunct 222. The second client virtual I/O 227 may access the second virtual function 235 via the second VF adjunct 225. A third client virtual I/O 228 executing at the second logical partition 207 may access the second instance of the first virtual function 233 via the third VF adjunct 223. An Nth client virtual I/O 229 executing at the Nth logical partition 208 may access the Nth instance of the first virtual function 233 via the Nth VF adjunct 224.

Thus, if a logical partition (e.g., one of the N logical partitions 206-208) is shutdown, one or both of the hypervisor 204 and the dispatchable hypervisor 290 may receive an instruction to reset a virtual function (e.g., one or more of the virtual functions 232-235) that is assigned to a logical partition (e.g., one of the N logical partitions 206-208). One or both of the hypervisor 204 and the dispatchable hypervisor 290 may reset the virtual function and reset the portion of the internal resources of the hardware I/O adapter that are allocated to the virtual function. Resetting the virtual function may enable the virtual function to be assigned to another logical partition.

It will be appreciated by one skilled in the art that the present invention is equally suited to embodiments that do not utilize a virtual function (VF) manager and client virtual I/O to enable a logical partition to access a virtual function, and instead enable a device driver within a logical partition to directly manage the virtual function.

Figure 3:
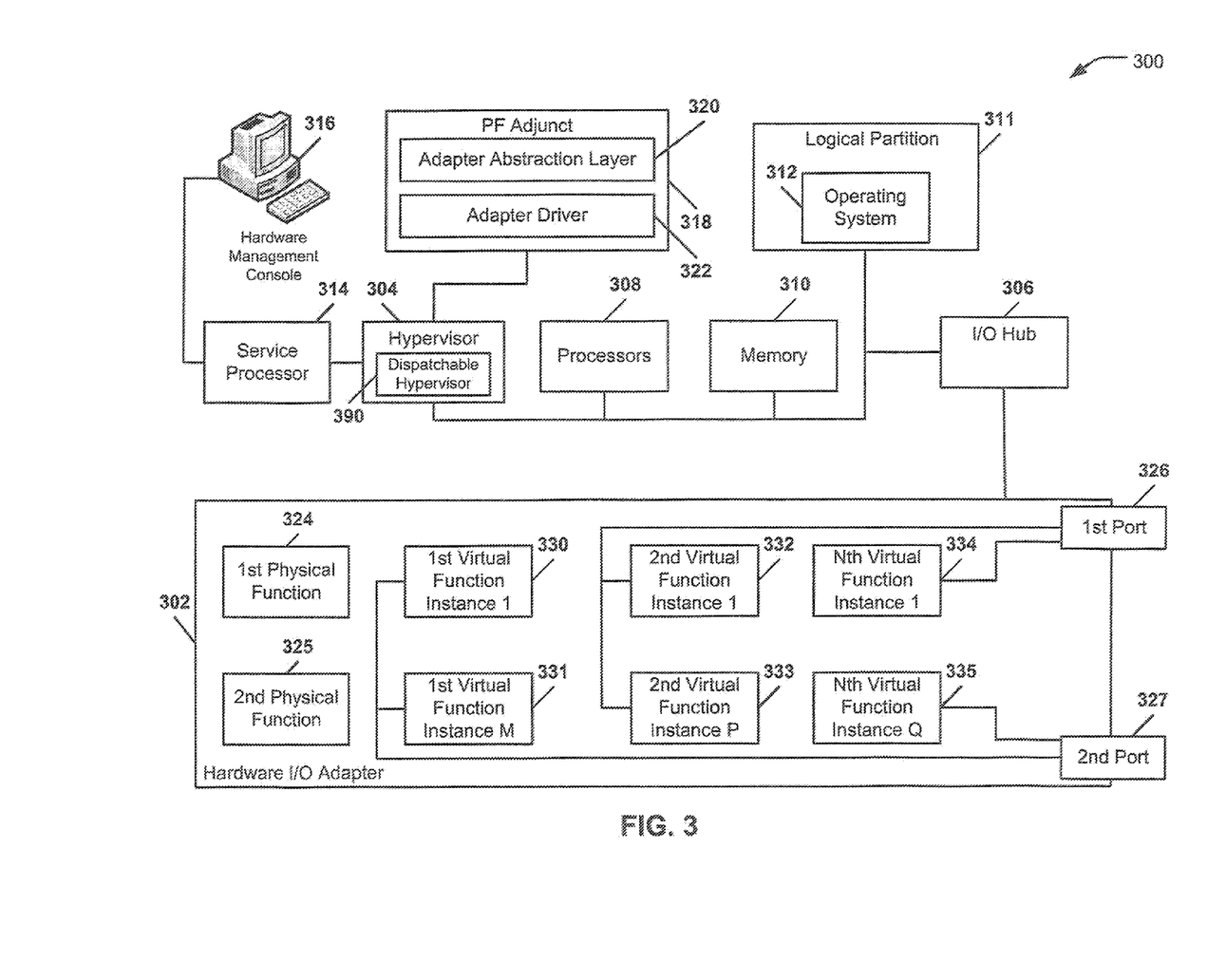
FIG. 3 is a block diagram of a third embodiment of a system to enable resetting a virtual function.

Referring to FIG. 3, a block diagram of a third embodiment of a system to enable resetting a virtual function is depicted and generally designated 300. In the system 300, a hypervisor 304 may be coupled to hardware devices, such as a hardware I/O adapter 302, an I/O hub 306, processors 308, and a memory 310. The hypervisor 304 may be coupled to a logical partition 311 that executes an operating system 312. The hypervisor 304 may enable the logical partition 311 to access virtual functions associated with the hardware I/O adapter 302. A physical function (PF) manager 318 may be coupled to the hypervisor 304 to manage the physical functions of the hardware I/O adapter 302. In a particular embodiment, the PF manager 318 may be in a logical partition. A hardware management console 316 may be coupled to the hypervisor 304 via a service processor 314.

The hypervisor 304 may perform various functions in combination with a dispatchable hypervisor 390. The dispatchable hypervisor 390 may be low level firmware code that can execute in a preemptible mode. For example, the hypervisor 304 may dispatch the dispatchable hypervisor 390 for execution in a manner similar to the way the hypervisor 304 dispatches different logical partitions for execution. In contrast, the hypervisor 304 may execute in a non-dispatchable mode that may be referred to as kernel mode.

The service processor 314 may be a microcontroller that is embedded in a hardware server (e.g., the hardware server 102 of FIG. 1) to enable remote monitoring and management of the hardware server via the hardware management console 316. For example, the hardware management console 316 may be used by a system administrator to specify a configuration of hardware devices, such as specifying virtual functions of the hardware I/O adapter 302. The PF manager 318 may configure virtual functions of the hardware I/O adapter 302 based on configuration information provided by a system administrator via the hardware management console 316.

The hypervisor 304 may enable hardware devices, such as the hardware I/O adapter 302, to be logically divided into virtual resources and accessed by one or more logical partitions (e.g., the N logical partitions 206-208 of FIG. 2). The I/O hub 306 may include a pool of interrupt sources 328. The hypervisor 304 may associate at least one interrupt source from the pool of interrupt sources 328 with each virtual function of the hardware I/O adapter 302.

The I/O hub 306 may be a hardware device (e.g., a microchip on a computer motherboard) that is under the control of the hypervisor 304. The I/O hub 306 may enable the hypervisor to control I/O devices, such as the hardware I/O adapter 302.

The processors 308 may include one more processors, such as central processing units (CPUs), digital signal processors (DSPs), other types of processors, or any combination thereof. One or more of the processors 308 may be configured in a symmetric multiprocessor (SMP) configuration.

The memory 310 may include various types of memory storage devices, such as random access memory (RAM) and disk storage devices. The memory 310 may be used to store and retrieve various types of data. For example, the memory 310 may be used to store and to retrieve operational instructions that are executable by one or more of the processors 308.

The operating system 312 may execute within the logical partition 311. The virtual I/O of client applications (e.g., the client virtual I/Os 226-229 of FIG. 2) that execute using the operating system 312 may access virtual functions of the hardware I/O adapter 302. The hypervisor 304 may use the I/O hub 306 to connect to and control I/O devices, such as the hardware I/O adapter 302.

The PF manager 318 may include an adapter abstraction layer 320 and an adapter driver 322. The adapter abstraction layer 320 may include a generic abstraction to enable configuration of physical functions and virtual functions of the hardware I/O adapter 302. The adapter driver 322 may be specific to each particular model of hardware adapter. The adapter driver 322 may be provided by a manufacturer of the hardware I/O adapter 302.

The hardware I/O adapter 302 may include physical functions and ports, such as a first physical function 324, a second physical function 325, a first port 326, and a second port 327. The PF manager 318 may configure virtual functions based on the physical functions 324, 325 and associate the virtual functions with one or more of the ports 326, 327 of the hardware I/O adapter 302. For example, the PF manager 318 may configure the first physical function 324 to host multiple instances of a first virtual function, such as the first instance of the first virtual function 330 and the Mth instance of the first virtual function 331, where M is greater than 1. The instances of the first virtual function 330, 331 may be associated with the second port 327. The PF manager 318 may configure the second physical function 325 to host multiple instances of a second virtual function, such as the first instance of the second virtual function 332 and the Pth instance of the second virtual function 333, where P is greater than 1. The instances of the second virtual function 332, 333 may be associated with the first port 326. The PF manager 318 may configure multiple instances of an Nth virtual function, such as the first instance of the Nth virtual function 334 and the Qth instance of the Nth virtual function 335, where N is greater than 2, and Q is greater than 1. The instances of the Nth virtual function 334, 335 may be associated with the second port 327. The instances of the Nth virtual function 334, 335 may be hosted by a physical function, such as one of the first physical function 324, the second physical function 325, and another physical function (not shown).

The hypervisor 304 may thus enable access to the virtual functions 330-335 that are associated with the physical functions 324, 325 of the hardware I/O adapter 302. The virtual functions 330-335 of the hardware I/O adapter 302 may be configured prior to a runtime and dynamically assigned during runtime, as described below. For example, the hypervisor 304 may configure the virtual functions 330-335 during a time period that is prior to runtime (e.g., during a boot time period or during a firmware standby time period). During the runtime, the hypervisor 304 may assign the pre-configured virtual functions 330-335 to a logical partition (e.g., the local partition 311) to enable client applications that are executing in the logical partition to perform I/O operations.

Figure 4:
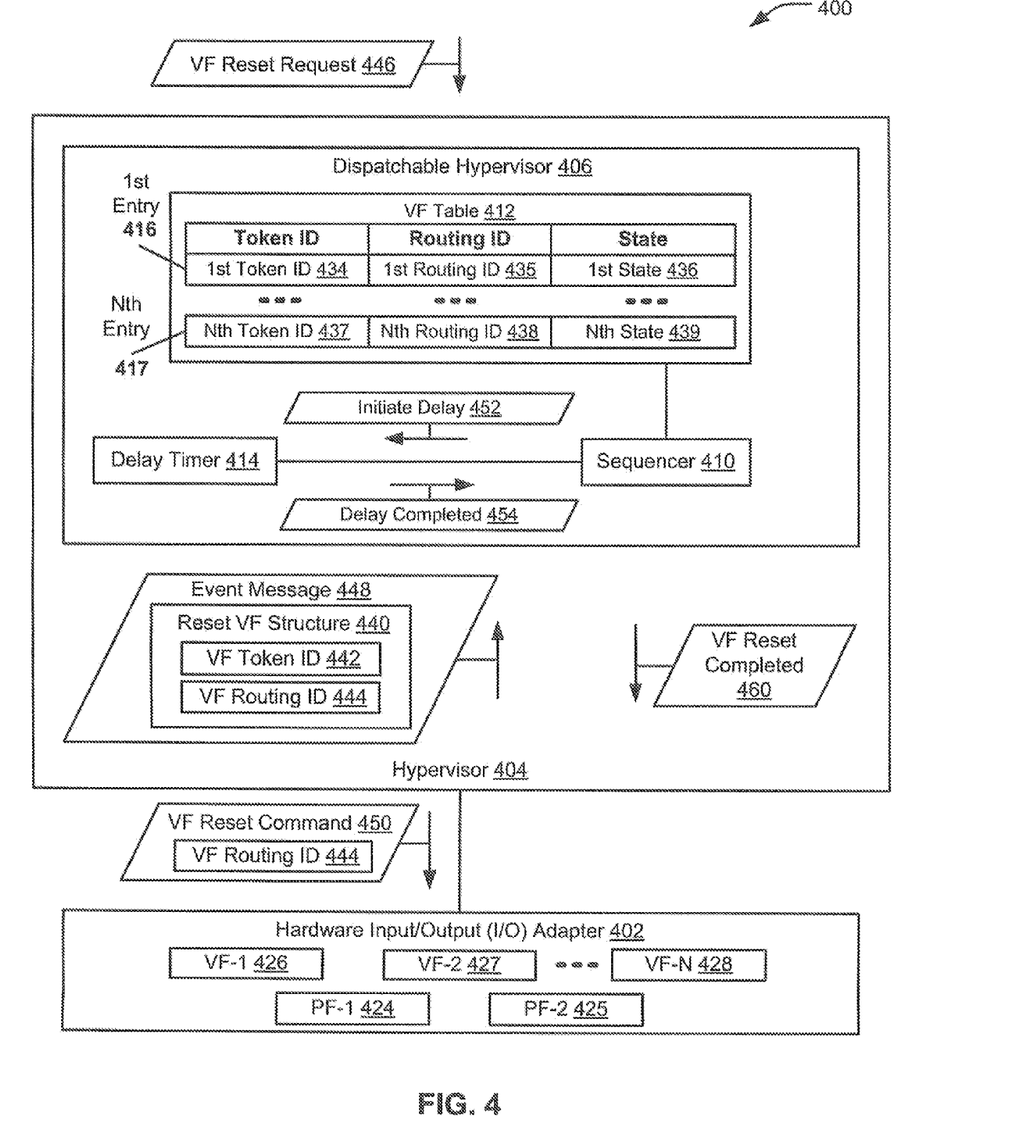
FIG. 4 is a block diagram of a fourth embodiment of a system to enable resetting a virtual function.

Referring to FIG. 4, a block diagram of a fourth embodiment of a system to enable resetting a virtual function is depicted and generally designated 400. The system 400 includes a hardware input/output (I/O) adapter 402 that is capable of providing virtual functions to logical partitions. A hypervisor 404 may manage the virtual functions that are hosted by the hardware I/O adapter 402.

The hardware I/O adapter 402 may include multiple physical functions, such as a first physical function 424 and a second physical function 425. The hardware I/O adapter 402 may host virtual functions based on the physical functions 424-425. For example, the hardware I/O adapter 402 may host a first virtual function 426, a second virtual function 427, and an Nth virtual function 428 (where N is greater than two).

A dispatchable hypervisor 406 may be a firmware partition that is dispatchable, similar to how logical partitions are dispatched for execution in a computing environment with multiple logical partitions. The dispatchable hypervisor 406 may be preemptible when it is executing. In contrast, the hypervisor 404 may be non-preemptible (e.g., it may execute at a kernel mode that is at a lower execution level than the dispatchable hypervisor 406) when the hypervisor is executing.

The dispatchable hypervisor 406 may include a sequencer 410, a delay timer 414, and a virtual function (VF) table 412. In FIG. 4, the sequencer 410, the delay timer 414, and the VF table 412 are depicted as being located within the dispatchable hypervisor 406. In another embodiment, one or more of the sequencer 410, the delay timer 414, and the VF table 412 may be located in another location besides the dispatchable hypervisor 406. For example, one or more of the sequencer 410, the delay timer 414, and the VF table 412 may be located within the hypervisor 404. In an alternate embodiment, one or more of the sequencer 410, the delay timer 414, and the VF table 412 may be located in another location, such as a memory, that is accessible to both the hypervisor 404 and the dispatchable hypervisor 406.

The VF table 412 may include entries, such as a first entry 416 and an Nth entry 417, that correspond to the virtual functions that are hosted by the hardware I/O adapter 402. For example, the first entry 416 may correspond to the first virtual function 426 and the Nth entry 417 may correspond to the Nth virtual function 428. Each of the entries 416-417 may include data that is associated with the corresponding virtual functions 426-428. The first entry 416 may include data, such as a first token identifier 434, a first routing identifier 435, and a first state 436, that is associated with the first virtual function 426. The Nth entry 417 may include data, such as an Nth token identifier 437, an Nth routing identifier 438, and an Nth state 439, that is associated with the Nth virtual function 428. The dispatchable hypervisor 406 and the sequencer 410 may be capable of accessing and updating the entries 416-417 of the VF table 412. The delay timer 414 may be capable of performing a delay.

In operation, the hypervisor 404 may receive a VF reset request 446. The VF reset request 446 may be received from a logical partition (e.g., one of the logical partitions 206-208 of FIG. 2) that is in the process of shutting down. For example, when a particular logical partition is shutting down, as part of the shutdown process, the logical partition or an adjunct of the hypervisor 406 may send the VF reset request 446 to the hypervisor 404. For example, the VF reset request 446 may be sent by a PF adjunct (e.g., the PF adjunct 220 of FIG. 2) or a VF adjunct (e.g., one of the VF adjuncts 222-224 of FIG. 2).

The hypervisor 404 may create a reset VF structure 440. The reset VF structure 440 may include a VF token identifier 442 and a VF routing identifier 444. The hypervisor 404 may retrieve at least one of the VF token identifier 442 and the VF routing identifier 444 from the VF table 412, from the VF reset request 446, or both. For example, the VF reset request 446 may include an identifier of the logical partition that is being shut down. The hypervisor 404 may maintain data (e.g., a table or a database) identifying which virtual functions are associated with each logical partition. The hypervisor 404 may retrieve one or both of the VF token identifier 442 and the VF routing identifier 444 based on data contained in the VF reset request 446. The hypervisor 404 may send an event message 448 that includes the reset VF structure to the dispatchable hypervisor 406.

The VF token identifier 442 of the reset VF structure 440 may be used to access each entry (e.g., one of the entries 416-417) of the VF table 412. For example, the sequencer 410 may use the VF token identifier 442 as an index into the VF table 412 to access one of the entries 416-417.

After receiving the event message 448, the dispatchable hypervisor 406 may retrieve an entry (e.g., one of the N entries 416-417) of the VF table 412 using the VF token identifier 442 that is included in the reset VF structure 440. The dispatchable hypervisor 406 may set a state of the virtual function in the entry to a reset pending state. For example, the dispatchable hypervisor 406 may set the first state 436, that corresponds to the first virtual function 426, to the reset pending state. Setting the state of an entry in the VF table 412 to the reset pending state may result in queuing the corresponding virtual function for a reset operation.

The dispatchable hypervisor 406 may determine whether a delay is in progress. For example, the dispatchable hypervisor 406 may determine whether the delay timer 414 is active (e.g., performing a delay). In response to determining that a delay is not in progress, the dispatchable hypervisor 406 may instruct the sequencer 410 to scan the N entries 416-417 of the VF table 412 (e.g., as described in FIG. 7).

The sequencer 410 may scan each of the entries (e.g., the entries 416-417) of the VF table 412 and perform a particular action based on a state that is stored in each entry. For example, if the state of a particular entry of the VF table 412 is reset pending, the sequencer 410 may send a VF reset command 450 to reset the virtual function that corresponds to that entry. To illustrate, the sequencer 410 may send the VF reset command 450, that includes the VF routing identifier 444, to the hardware I/O adapter 402. The VF routing identifier 444 may enable the VF reset command 450 to be routed to the appropriate virtual function at the hardware I/O adapter 402. For example, when the VF routing identifier 444 comprises the first routing identifier 435, the VF reset command 450 may be routed to the first virtual function 426 to reset the first virtual function 426.

The sequencer 410 may indicate that a delay is to be performed. For example, the sequencer 410 may set a delay needed flag to indicate that the delay is to be performed. The delay may be performed after the entries of the VF table 412 have been scanned and a VF reset command has been sent for each entry whose state is set to reset pending. The delay may be performed to enable the virtual function that receives the VF reset command 450 to complete a reset operation before the virtual function is assigned to a logical partition. For example, if the delay were not performed, one or more of the virtual functions of the hardware I/O adapter may be assigned to a logical partition before the virtual function has completed resetting.

After sending the VF reset command 450, the sequencer 410 may set the state of the virtual function in the entry of the VF table 412 to reset in progress to indicate that the corresponding virtual function is in the process of resetting. Thus, for each entry in the VF table 412 that has a state of reset pending, the sequencer 410 may send the VF reset command 450, and change the state of the entry from reset pending to reset in progress. Thus, the sequencer 410 may examine each entry of the VF table 412 and reset each VF that has a corresponding entry in the VF table 412 with a state of reset pending.

If a delay is needed because at least one VF reset command 450 has been sent to the hardware I/O adapter 402, a delay may be performed. In a particular embodiment, the sequencer 410 may instruct the delay timer 414 to perform a delay by sending an initiate delay 452 message to the delay timer 414. After the delay timer 414 has completed performing the delay, the delay timer 414 may send a delay completed message 454 to the sequencer 410. In response to receiving the delay completed message 454, the sequencer 410 may scan through each entry in the VF table 412 and perform one or more actions based on the state of each entry in the VF table 412. If the sequencer 410 determines that a state of an entry in the VF table 412 is reset in progress, the sequencer 410 may inform the hypervisor 404 that the virtual function has been reset and set the state of the virtual function in the entry of the VF table 412 to idle. For example, if the sequencer 410 determines that a state of an entry in the VF table 412 is reset in progress, the sequencer 410 may send a VF reset completed 460 message to the hypervisor 404. After the hypervisor 404 has received the VF reset completed 460 message, the hypervisor 404 may reassign the virtual function to another logical partition. For example, after the first virtual function 426 has reset, the hypervisor 404 may reassign the virtual function from a first logical partition to a second logical partition.

When the delay timer 414 is performing the delay, if another of the VF reset request 446 messages is received, the hypervisor 404 may create the reset VF structure 440 and send the event message 448 to the dispatchable hypervisor 406. The dispatchable hypervisor 406 may retrieve an entry in the table 412 that corresponds to the VF token identifier 442 and set the state of the entry to reset pending. Thus, if VF reset requests (e.g., such as the VF reset request 446) are received while the delay timer 414 is performing the delay, virtual function resets may be queued by setting entries in the VF table 412 to reset pending. After the delay timer 414 has sent the delay completed message 454 to the sequencer 410, the sequencer 410 may scan the VF table 412 and send the VF reset command 450 for each entry in the VF table 412 that has the reset pending state.

Thus, in FIG. 4, in a particular embodiment, the VF reset request 446 may cause the state of an entry in the VF table 412 to be set to reset pending. The virtual function corresponding to the entry may be sent the VF reset command 450, the state of the entry may be set to reset in progress, and a delay may be performed by the delay timer 414. While the delay is being performed, VF reset requests that are received may cause one or more entries of the VF table 412 to be set to reset pending. After the delay timer 414 has completed performing the delay, the sequencer 410 may scan each entry in the VF table 412. For each entry of the VF table 412 that has a state of reset pending, the VF reset command 450 may be sent and the state set to reset in progress. For each entry of the VF table 412 that has a state of reset in progress, the state may be set to idle.

Figure 5:
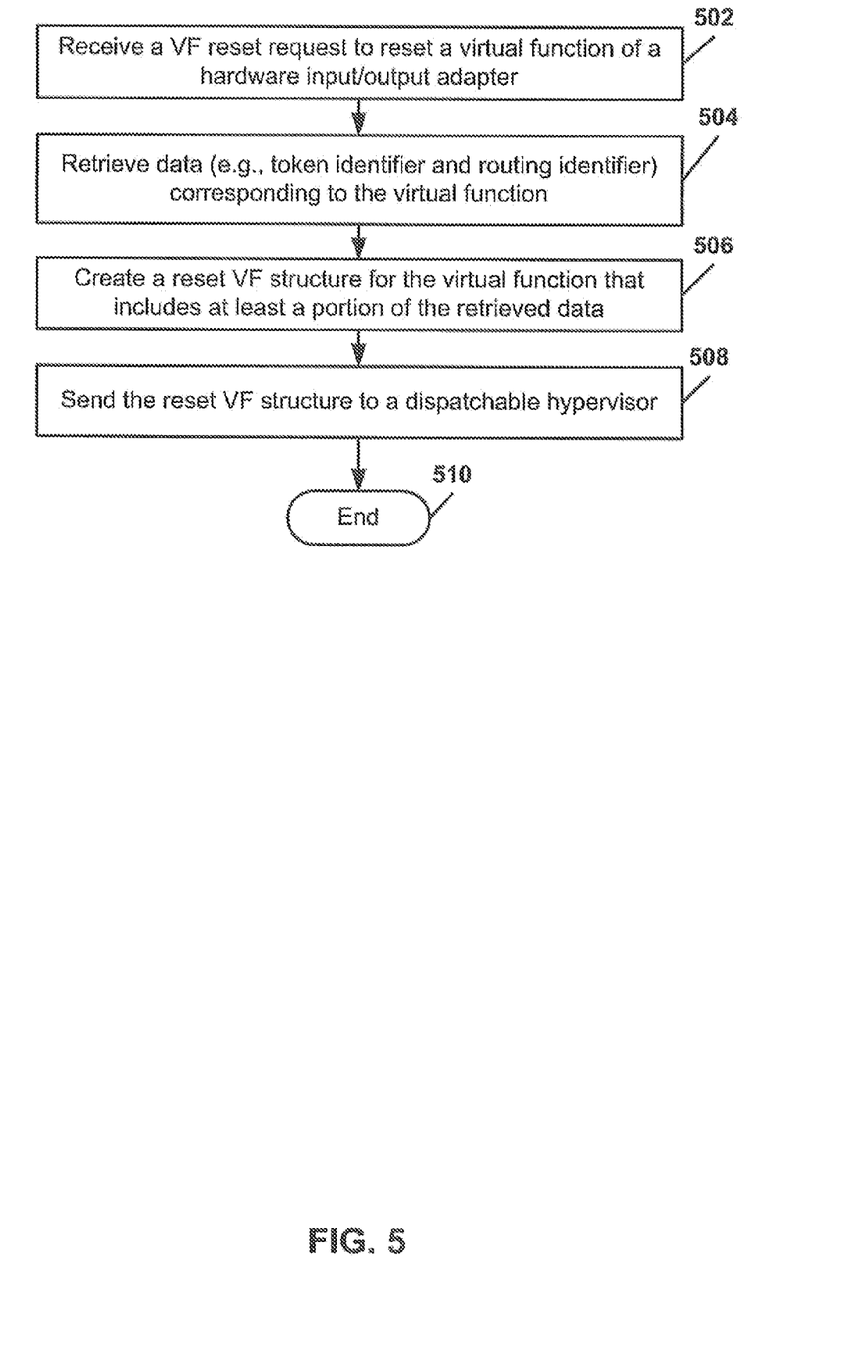
FIG. 5 is a flow diagram of a first method to enable resetting a virtual function.

Referring to FIG. 5, a flow diagram of a first method to enable resetting of virtual function is depicted. The method of FIG. 5 may be performed by a hypervisor such as the hypervisor 110 of FIG. 1, the hypervisor 204 of FIG. 2, the hypervisor 304 of FIG. 3, and the hypervisor 404 of FIG. 4.

A virtual function (VF) reset request to reset a virtual function (VF) of a hardware input/output (I/O) adapter may be received, at 502. The request may be received from a logical partition that is in the process of shutting down or from an adjunct such as a VF adjunct or a PF adjunct. Moving to 504, data (e.g., a token, a routing identifier, additional data associated with a virtual function, or any combination thereof) corresponding to the virtual function may be retrieved. The token may be retrieved from the reset request or from a table, such as the VF table 412 of FIG. 4. The routing identifier may be retrieved from the reset request or from a table, such as the VF table 412 of FIG. 4.

Advancing to 506, a reset VF structure may be created for the virtual function. The reset VF structure may include at least a portion of the retrieved data. For example, in FIG. 4, the reset VF structure 440 may include one or more of the VF token identifier 442 and the VF routing identifier 444. Proceeding to 508, the reset VF structure may be sent to a dispatchable hypervisor and the method may end at 510. For example, in FIG. 5, the hypervisor 404 may send the reset VF structure 440 via an event message 448 to the dispatchable hypervisor 406. Thus, the hypervisor 404 may create the reset VF structure 440 in response to receiving a request to reset a virtual function at a hardware I/O adapter.

Figure 6:
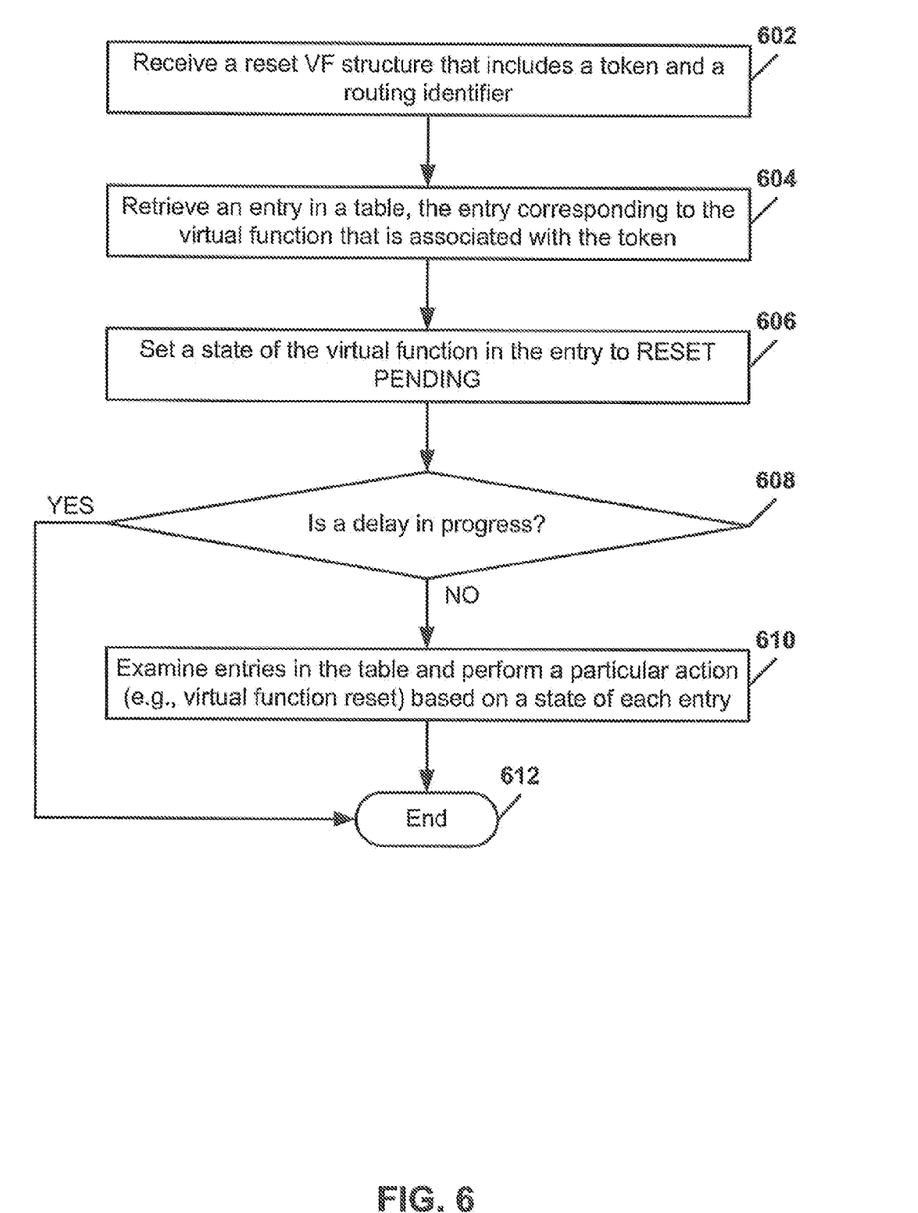
FIG. 6 is a flow diagram of a second method to enable resetting a virtual function.

Referring to FIG. 6, a flow diagram of a second method to enable resetting a virtual function is depicted. The method of FIG. 6 may be performed by a dispatchable hypervisor, such as the dispatchable hypervisor 406 of FIG. 4.

The method begins when a reset VF structure is received, at 602. For example, the reset VF structure may be received from a hypervisor. The reset VF structure may include a token and a routing identifier. Moving to 604, an entry in a table may be retrieved. The entry may correspond to a virtual function that is associated with the token. For example, in FIG. 4, the dispatchable hypervisor 406 may retrieve an entry in the VF table 412 via the VF token identifier 442 of the reset VF structure 440. The retrieved entry may include data that corresponds to one of the virtual functions 426-428 of the hardware I/O adapter 402.

Proceeding to 606, a state in the entry may be set to reset pending. For example, in FIG. 4, the dispatchable hypervisor 406 may set a state of an entry in the VF table 412 to reset pending. Proceeding to 608, a determination may be made whether a delay is in progress. If a delay is in progress, then the method may end, at 612. For example, if a delay is in progress, the dispatchable hypervisor may continue to receive reset VF structures and set the state of the virtual function identified by a portion of the reset VF structure to reset pending.

If the delay is not in progress, the method may proceed to 610 where entries in the table may be examined. A particular action may be performed based on a state of each entry. For example, in FIG. 4, if the delay timer 414 is not performing a delay, the dispatchable hypervisor 406 may instruct the sequencer 410 to scan the VF table 412 and perform a particular action based on the state of the each entry in the VF table 412, as described in FIG. 7. If the delay timer 414 is not performing a delay, the sequencer 410 may send the VF reset command 450 for each entry in the VF table 412 that has a reset pending state. The method ends at 612.

Thus, the dispatchable hypervisor may set a state in an entry of a VF table that corresponds to a virtual function at a hardware I/O adapter. The dispatchable hypervisor 406 may instruct a sequencer to scan the VF table and perform one or more actions based on the state of each entry in the VF table. For example, the sequencer may reset virtual functions whose state in the VF table is reset pending.

Figure 7:
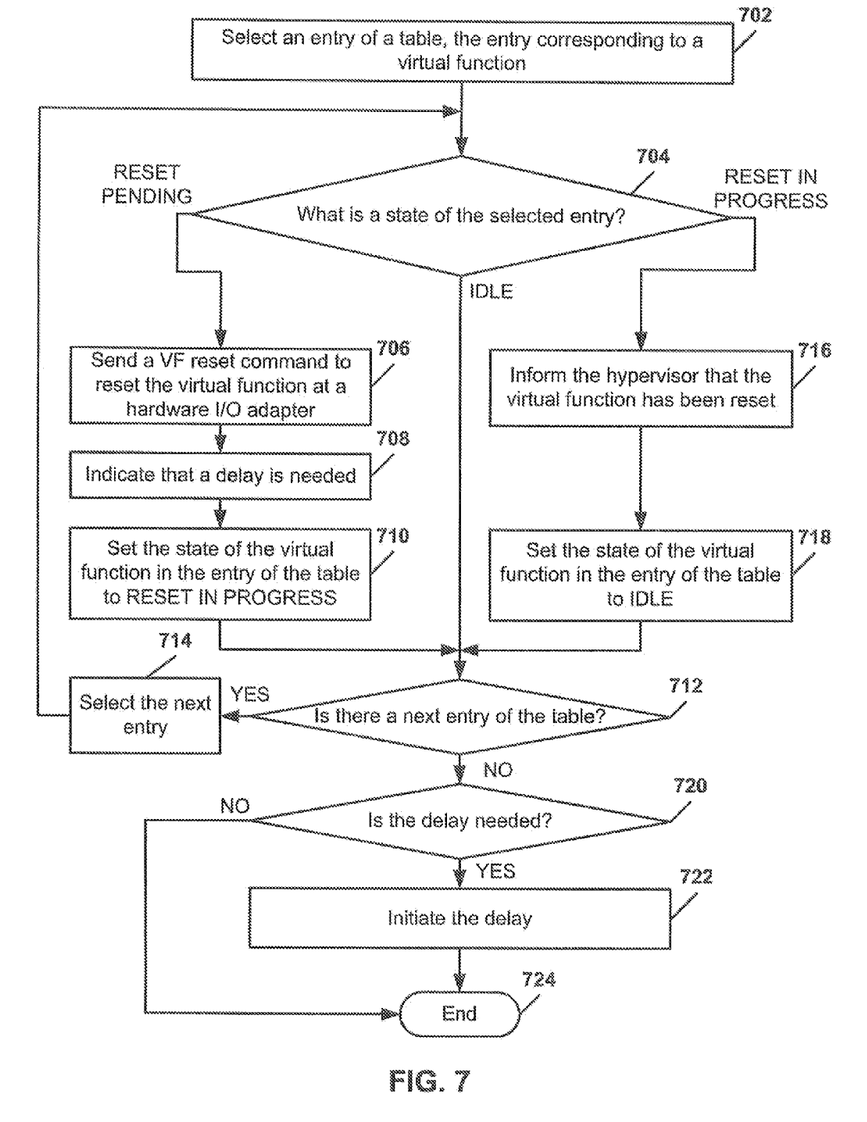
FIG. 7 is a flow diagram of a third method to enable resetting a virtual function.

Referring to FIG. 7, a flow diagram of a third method to enable resetting a virtual function is depicted. The method of FIG. 7 may be performed by a sequencer, such as the sequencer 410 of FIG. 4.

The method begins, at 702, when an entry of a table is selected. The selected entry may correspond to a virtual function at a hardware input/output (I/O) adapter. Advancing to 704, a state of the selected entry may be determined.

If at 704, a determination is made that the state of the virtual function associated with the selected entry is in a reset pending state, the method may proceed to 706 where a VF reset command may be sent to reset the virtual function at the hardware I/O adapter. Continuing to 708, the sequencer may indicate that a delay is needed. For example, the sequencer may set a delay needed flag to indicate that a delay is needed. Continuing to 710, the state in the entry of the table may be set to reset in progress. For example, in FIG. 4, the state of one of the N entries 416-417 of the VF table 412 may be changed from reset pending to reset in progress. The method may proceed to 712 where a determination may be made whether there is a next entry of the table. If a determination is made, at 712, that there is a next entry of the table, the next entry may be selected at 714 and the method may proceed to 704 where a determination may be made as to the state of the virtual function associated with the selected entry.

If a determination is made, at 704, that the state of the selected entry is reset in progress, the method may proceed to 716 where the hypervisor may be informed that the virtual function has been reset. The hypervisor may reassign the reset virtual function to another logical partition. Continuing to 718, the state of the virtual function in the entry of the table may be set to idle. The method may proceed to 712 where a determination is made whether there is a next entry of the table. If a determination is made, at 712, that there is a next entry of the table, the next entry may be selected at 714 and the method may proceed to 704 where a determination may be made as to the state of the virtual function associated with the selected entry.

If a determination is made, at 704, that the state of the selected entry is idle, the method may proceed to 712. If a determination is made, at 712, that there is a next entry of the table, the next entry may be selected at 714 and the method may proceed to 704 where a determination may be made as to the state of the virtual function associated with the selected entry.

If a determination is made, at 712, that there is not a next entry in the table, a determination may be made whether a delay is needed, at 720. For example, in FIG. 4, after the sequencer 410 has examined a state of each of the N entries 416-417 of the VF table 412, there may not be a next entry to examine. If a determination is made, at 720, that a delay is needed, the delay may be initiated, at 722 and the method may end, at 724. For example, in FIG. 4, the sequencer 410 may send the initiate delay 452 message to instruct the delay timer 414 to perform the delay. When a determination is made, at 720, that a delay is not needed, the method may end at 724.

Thus, the sequencer may send a VF reset command to reset a virtual function for each entry in the VF table that has a reset pending state. After sending one or more of the VF reset commands, the sequencer may cause a delay to be performed. After the delay is complete, the sequencer may scan the entries of the VF table. The sequencer may set the state of those entries that were reset in progress to idle. The sequencer may set the state of those entries that were reset pending to reset in progress and send a reset command to reset the corresponding virtual functions at a hardware I/O adapter.

Figure 8:
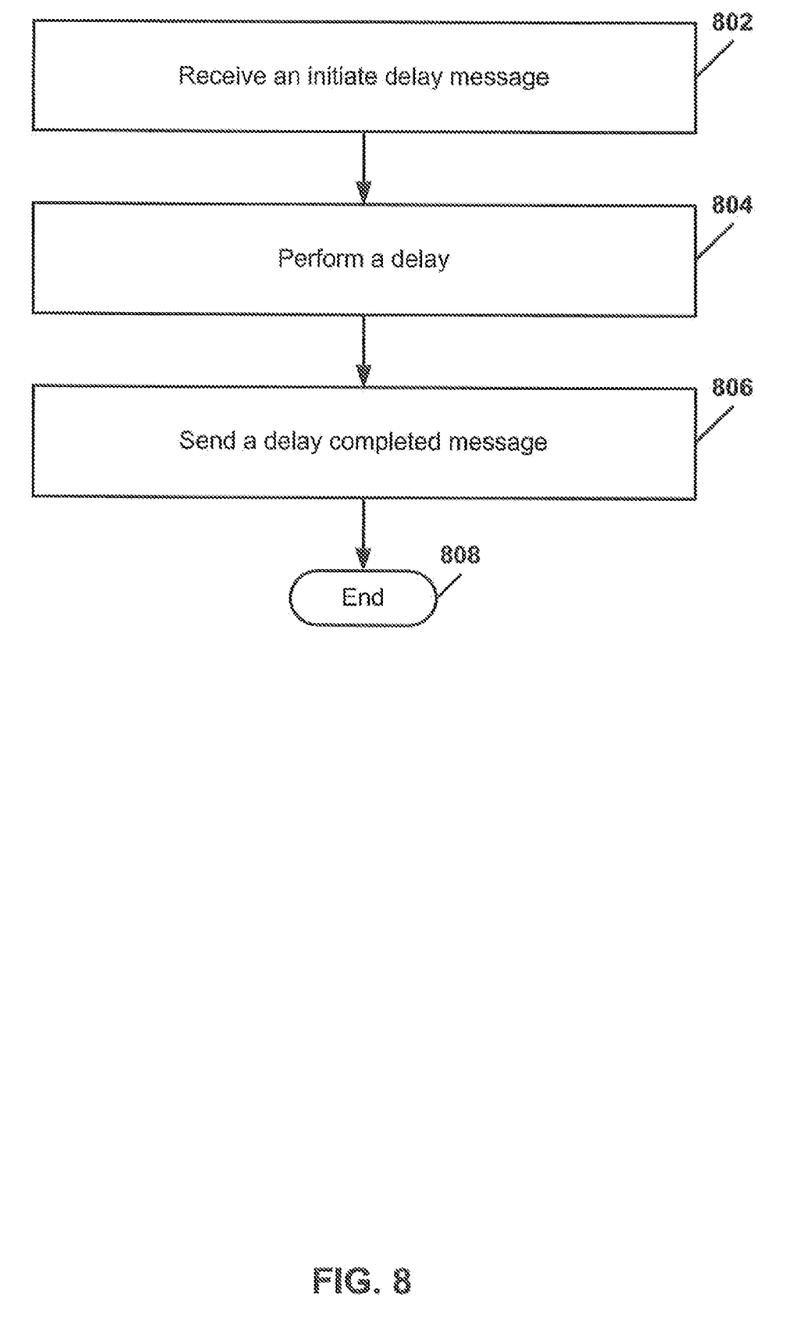
FIG. 8 is a flow diagram of a fourth method to enable resetting a virtual function.

Referring to FIG. 8, a flow diagram of a fourth method to enable resetting virtual functions is depicted. The method of FIG. 8 may be performed by a delay timer, such as the delay timer 414 of FIG. 4.

An initiate delay message may be received, at 802. Continuing to 804, a delay may be performed. Advancing to 806, a delay completed message may be sent. The method may end at 808. For example, in FIG. 4, the delay timer 414 may receive the initiate delay 452 message from the sequencer 410. In response, the delay timer 414 may perform a delay. While the delay timer 414 is performing the delay, the sequencer 410 may wait for the delay timer 414 to complete the delay. After the delay timer 414 has completed performing the delay, the delay timer 414 may send a delay completed 454 message to the sequencer 410. After the sequencer 410 receives the delay completed message 454 the sequencer 410 may scan the entries of the VF table 412 and perform various actions based on the state of each entry in the VF table 412.

In a particular embodiment, instead of sending messages (e.g., the initiate delay message and the delay completed message) the delay may be performed via a function call. For example, in FIG. 4, the sequencer 410 may call the delay timer 414 to perform the delay. The sequencer 410 may suspend execution until the delay timer 414 has completed performing the delay. After the delay timer 414 has completed performing the delay, the sequencer 410 may resume execution. As another example, the sequencer 410 may call the delay timer 414 and provide a callback function (not shown). When the delay timer 410 has completed performing the delay, the delay timer 414 may invoke the callback function to cause the sequencer 410 to scan the VF table 412.

Thus, in a particular embodiment, when the first VF reset request 446 is received, the dispatchable hypervisor 406 may set a state of an entry in the VF table 412 to reset pending and instruct the sequencer 410 to scan the VF table 412 (e.g., as described in FIG. 7). The sequencer 410 may scan the entries of the VF table 412, send the VF reset command 450 for each entry that has a reset pending state, and call the delay timer 414 to perform a delay. While the delay is being performed, the dispatchable hypervisor 406 may set the state of one or more of the entries in the VF table 412 to the reset pending state in response to receiving one or more additional VF reset requests. After the delay timer 414 has completed performing the delay, the sequencer 410 may scan the N entries 416-417 of the VF table 412. Thus, initially, the dispatchable hypervisor 406 may call the sequencer 410 to process the first batch of VF reset requests (e.g., the first VF reset request 446 that is received) by instructing the sequencer 410 to scan the entries of the VF table 412. Subsequently, the sequencer 410 may scan the entries of the VF table 412 after the delay timer 414 performs a delay. The sequencer 410 may scan the entries of the VF table 412 after each delay. In other words, the dispatchable hypervisor 406 may call the sequencer 410 initially to scan the entries of the VF table 412 and subsequently, the sequencer 410 may scan the entries of the VF table 412 after each delay has been performed.

In another particular embodiment, the delay timer 414 may send the delay completed 454 message to the dispatchable hypervisor 406 rather than to the sequencer 410. The dispatchable hypervisor 406 may call the sequencer 410 to scan the entries of the VF table 412 after a pre-determined period of time has elapsed, after a particular number of the VF reset requests 446 have been received, or any combination thereof.

In this particular embodiment, the dispatchable hypervisor 406 may initially instruct the sequencer 410 to scan the N entries 416-417 of the VF table 412 (e.g., as described in FIG. 7). Subsequently, after each delay has been performed, the dispatchable hypervisor 406 may instruct the sequencer 410 to scan the N entries 416-417 of the VF table 412.

Figure 9:
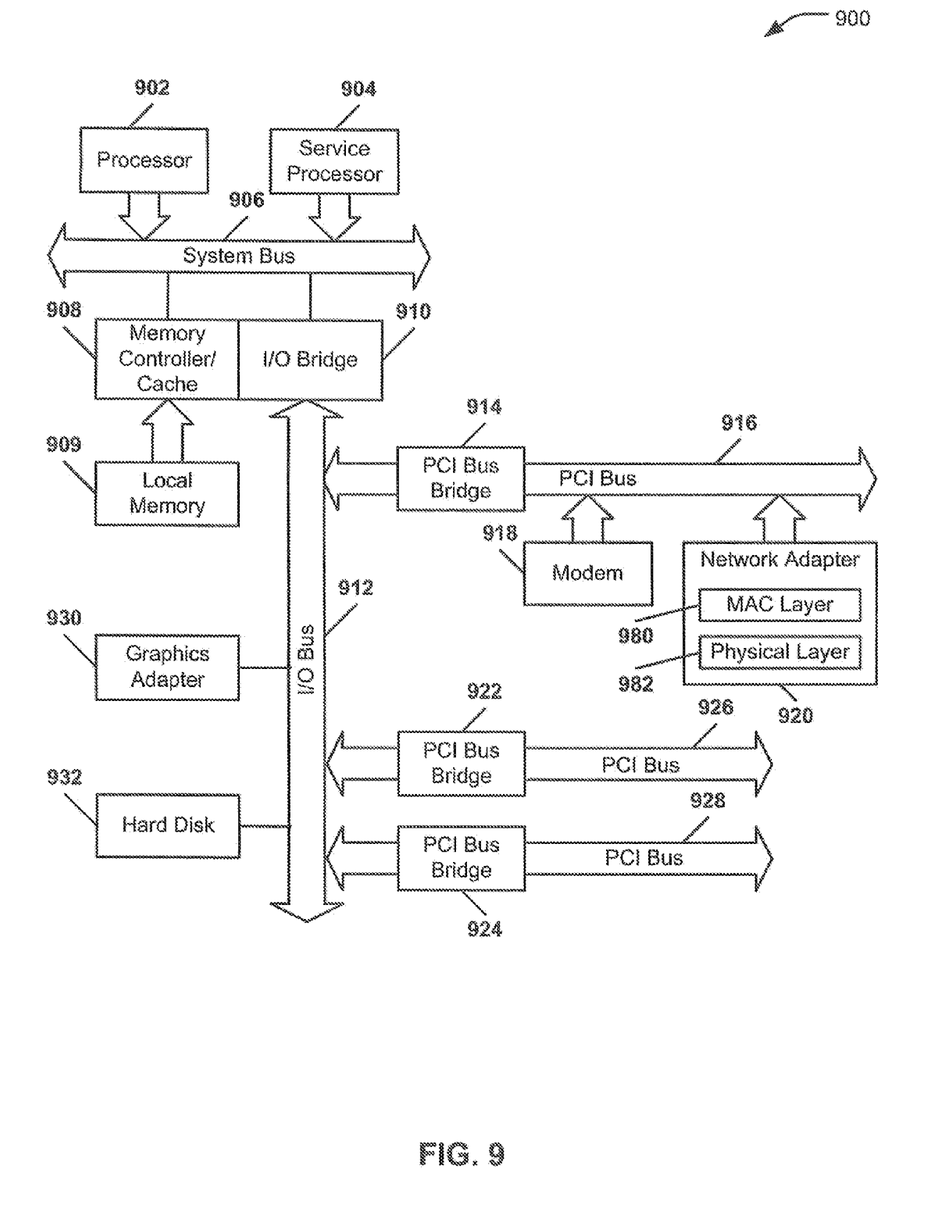
FIG. 9 is a block diagram of an illustrative embodiment of a general computer system.

Referring to FIG. 9, a block diagram of an illustrative embodiment of a general computer system is depicted and generally designated 900. The data processing system 900 may be a symmetric multiprocessor (SMP) system that includes a plurality of shared processors or SMT-capable processors, such as processors 902 and 904 connected to system bus 906. Alternatively, a single processor system may be employed. In the depicted example, processor 904 may be a service processor. Each SMT-capable processor may be capable of concurrently executing multiple hardware threads on the one processor.

Connected to system bus 906 may be memory controller/cache 908, which provides an interface to local memory 909. An I/O bus bridge 910 may be connected to a system bus 906 to provide an interface to I/O bus 912. A memory controller/cache 908 and an I/O bus bridge 910 may be integrated as depicted.

A peripheral component interconnect (PCI) bus bridge 914 connected to I/O bus 912 may provide an interface to PCI local bus 916. In FIG. 9, the term PCI in this application may also refer to variations and extensions of PCI, such as PCI express (PCIe). Multiple modems may be connected to PCI bus 916. Typical PCI bus implementations may support PCI expansion slots or add-in connectors. Communications links to network computers may be provided via modem 918 and network adapter 920 connected to PCI local bus 916 through add-in boards.

Network adapter 920 may include a physical layer 982 which enables analog signals to go out to a network, such as for example, an Ethernet network via an R45 connector. A media access controller (MAC) 980 may be included within network adapter 920. Media access controller (MAC) 980 may be coupled to bus 916 and processes digital network signals. MAC 980 may serve as an interface between bus 916 and physical layer 982. MAC 980 may perform a number of functions involved in the transmission and reception of data packets. For example, during the transmission of data, MAC 980 may assemble the data to be transmitted into a packet that includes address and error detection fields. During the reception of a packet, MAC 980 may disassemble the packet and perform address checking and error detection. In addition, MAC 980 may perform encoding/decoding of digital signals prior to transmission, perform preamble generation/removal, and bit transmission/reception.

Additional PCI bus bridges 922 and 924 may provide interfaces for additional PCI buses 926 and 928, from which additional modems or network adapters may be supported. In this manner, data processing system 900 may allow connections to multiple network computers. A memory-mapped graphics adapter 930 and hard disk 932 may be directly or indirectly connected to I/O bus 912.

Service processor 904 may interrogate system processors, memory components, and I/O bridges to generate and inventory the system 900. Service processor 904 may execute Built-In-Self-Tests (BISTs), Basic Assurance Tests (BATs), and memory tests on one or more of the elements in the system 900. Any error information for failures detected during the BISTs, BATs, and memory tests may be gathered and reported by service processor 904.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments, including embodiments of I/O adapters virtualized in multi-root input/output virtualization (MR-IOV) embodiments, or virtualized using software virtualization intermediaries, will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A computer implemented method, comprising:
  receiving, via a data processor, a reset request to reset a first virtual function of a plurality of virtual functions that are hosted by a hardware input/output adapter;
  identifying, via the data processor, a first logical partition that is associated with the first virtual function;

determining, via the data processor, whether or not the first logical partition has initiated a shutdown operation;

in response to determining that the first logical partition has initiated a shutdown operation, retrieving, via the data processor, first data corresponding to the first virtual function from a table;

creating, via the data processor, a first reset virtual function structure that includes at least a portion of the first data, wherein the first reset virtual function structure includes a token that enables the first logical partition to access the first virtual function to perform at least one of an input operation and an output operation;

sending, via the data processor, the first reset virtual function structure to a hypervisor to instruct the hypervisor to retrieve a first entry from the table, the first entry corresponding to the first virtual function that is associated with the token; and setting, via the data processor, a state field of the first entry to reset pending.

2. The computer implemented method of claim 1, wherein the first reset virtual function structure includes a routing identifier that identifies an address of the first virtual function at the hardware input/output adapter.

3. The computer implemented method of claim 2, further comprising:

creating, via the data processor, a reset message that includes the routing identifier; and sending, via the data processor, the reset message to the first virtual function at the hardware input/output adapter in response to determining that a delay is not in progress.

4. The computer implemented method of claim 3, wherein the reset message is sent to the first virtual function at the hardware input/output adapter based on the routing identifier.

5. The computer implemented method of claim 3, wherein the first virtual function performs a reset operation in response to receiving the reset message.

6. The computer implemented method of claim 1, wherein retrieving the first entry from the table comprises identifying the first entry based on the token.

7. The computer implemented method of claim 1, further comprising:

retrieving, via the data processor, second data corresponding to a second virtual function from the table;

identifying, via the data processor, a second logical partition that is associated with the second virtual function;

in response to determining that the second logical partition has initiated a shutdown process, retrieving, via the data processor, second data corresponding to the second virtual function from the table;

creating, via the data processor, a second reset virtual function structure that includes at least a portion of the second data; and sending, via the data processor, the second reset virtual function structure to the hypervisor.

8. A computer program product comprising a computer storage device having computer usable program code embodied therewith, the computer usable program code executable by a processor to:

receive a request to reset a first virtual function of a plurality of virtual functions that are hosted by a hardware input/output adapter;

identify a first logical partition that is associated with the first virtual function;

determine whether or not the first logical partition has initiated a shutdown process;

in response to determining that the first logical partition has initiated a shutdown process, retrieve first data corresponding to the first virtual function from a table;

create a first reset virtual function structure that includes at least a portion of the first data;

send the first reset virtual function structure to a hypervisor to instruct the hypervisor to retrieve a first entry from the table, the first entry corresponding to the first virtual function that is associated with a token; and set a state field of the first entry to reset pending.

9. The computer program product of claim 8, wherein the computer usable program code is further executable by the processor to:

create a reset message that includes the routing identifier; and send the reset message to reset the first virtual function at the hardware input/output adapter in response to determining that a delay is not in progress.

10. The computer program product of claim 8, wherein the computer usable program code is further executable by the processor to:

retrieve second data corresponding to a second virtual function from the table;

identify a second logical partition that is associated with the second virtual function;

in response to determining that the second logical partition has initiated a shutdown process, retrieve second data corresponding to the second virtual function from the table;

create a second reset virtual function structure that includes at least a portion of the second data; and send the second reset virtual function structure to the hypervisor.

* * * * *